Jan. 12, 1954          M. GRUNT          2,665,878
BALL VALVE
Filed March 7, 1950
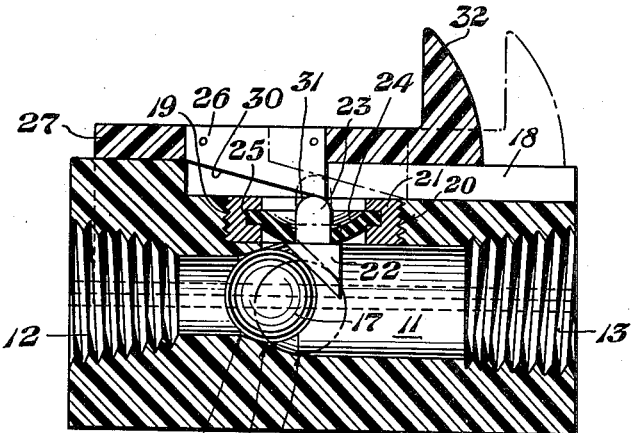
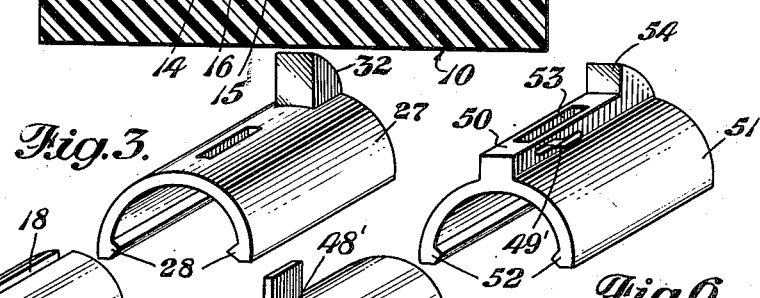
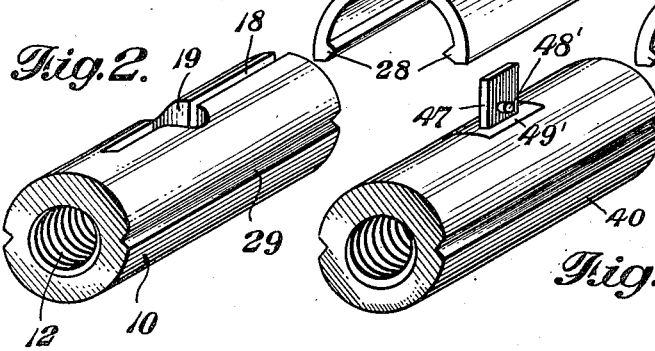
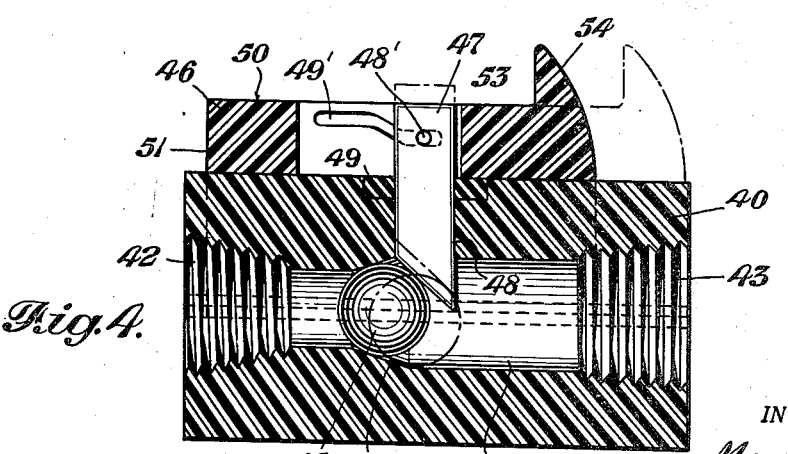
INVENTOR.
Max Grunt,
BY Flocks and Simon
ATTORNEYS Patented Jan. 12, 1954

2,665,878

UNITED STATES PATENT OFFICE 2,665,878

BALL VALVE

Max Grunt, Newark, N. J.

Application March 7, 1950, Serial No. 148,243

11 Claims. (Cl. 251—131)

This invention relates to a stop valve and more particularly to an improvement in ball valves used to control the flow of fluid in a line.

Previous valves of this type have been proposed involving a large number of parts which are difficult to assemble and equally difficult to dismantle for repair or replacement of parts.

This invention has as an object to provide a simple, effective, and easily-manipulated ball valve for a pipe line or the like.

A further object is to provide a valve for controlling the flow of fluids which can be cheaply manufactured from a minimum number of parts and can be readily assembled and inserted into a pipe line.

A still further object of the invention is to provide a ball valve in which the ball is laterally actuated to engage the valve seat in response to the vertical movement of a wedge.

Other objects and the nature and advantages of the instant invention will be apparent from the following description taken in conjunction with the accompanying drawings, wherein:

Fig. 1 is a vertical sectional view of the valve in closed position with the dotted lines showing the valve in opened position;

Fig. 2 is a perspective view of a stationary valve body for the valve shown in Fig. 1;

Fig. 3 is a perspective view of a sliding valve jacket for the valve body shown in Fig. 2;

Fig. 4 is a vertical sectional view similar to Fig. 1 of a modified form of the invention;

Fig. 5 is a perspective view of a stationary valve body for the valve shown in Fig. 4, and Fig. 6 is a perspective view of a sliding valve jacket for the valve body shown in Fig. 5.

Referring to the drawings and more particularly to Fig. 1, the reference numeral 10 refers to the valve body which is tubular in shape having a passageway 11 extending the length thereof which is provided with pipe threads 12, 13 at the inlet and outlet ends thereof respectively. The valve body is preferably made from a transparent material, although this is not essential.

The passageway 11 has a smaller diameter at the inlet end than at the outlet end thereof, the diameter thereof gradually increasing from the point 14 to the point 15 therein to form a tapered valve seating surface 16 therebetween. A ball 17 having a diameter intermediate between that of the inlet and outlet diameter of the valve body passageway operates as the valve which seats on the valve seat 16 and closes the inlet passageway when in the position illustrated by the solid lines in Fig. 1. A narrow slot 18 extends through one wall of the body 10 from the outlet end thereof to a point a short distance from the inlet end. A hole 19 is drilled through the body 10 centrally thereof coinciding with the slot 18. The lower end of the hole 19 is threaded as at 20, and a hollow plug 21 is inserted therein. The lower surface of plug 21 corresponds to the shape of the passageway 11 at the outlet end of the body 10, and the plug is screwed down until its lower surface is flush with the passageway 11. A wedge 22 extending into the passageway 11 is provided with a cylindrical extension 23 at the upper end thereof, and is adapted to reciprocate in a vertical plane with respect to the body 10. Leakage of the fluid flowing through the body is prevented by a gasket 24 engaging the extension 23 of the wedge 22. The gasket is fitted at its outer diameter into a slot 25 in the plug 21. The wedge 22 has a sloping surface at an approximate 45° angle to the vertical which engages the ball 17 and upon which the ball travels. Thus by lowering the wedge 22, the ball rides up on the sloping surface thereof and is forced to the left against the valve seat 16. Further downward pressure on the wedge 22 will hold the ball tightly against the seat 16.

The wedge 22 is actuated by means of a thin cam 26 which is securely attached to a sliding jacket 27 and adapted to ride in the slot 18 in the valve body. The sliding jacket 27 is semicylindrical and is provided with inwardly extending V-shaped flanges 28 at the lower ends thereof. The flanges 28 are adapted to slide within the guide tracks 29 provided on each side of the valve body. The tracks are so arranged that the sliding jacket 27 covers the upper half of the body 10, and the cam 26 extending downwardly within the jacket coincides with the slot 18 in the body and reciprocates therein. The cam surface 30 of cam 26 engages the upper rounded surface 31 of the wedge extension 23. A knob 32 is provided at the left end of the sliding jacket 27 for use in moving the sliding jacket as desired.

To assemble the valve construction described heretofore, the ball 17 is inserted into the passageway 11 through the outlet end thereof. The wedge 22 is next inserted through the opening 19, and the plug and gasket assembly are screwed into the threaded opening 20 with the gasket surrounding the wedge extension 23. The sliding jacket with its depending cam is placed around the body with the flanges thereon engaging the guide tracks 29 and the cam entering the slot 18 of the body 10. The valve is now ready for insertion into a pipe line as desired.

In operation, moving the jacket to the extreme left position causes the wedge to move downwardly on the cam surface. Downward movement of the wedge forces the ball to the left to engage the valve seat and shut off the flow of fluid in the line. Movement of the jacket to the right releases the wedge so that the pressure of the fluid in the line will force the ball to the right and the wedge upward, thus permitting the fluid to flow. The amount of flow can be controlled by the extent of movement of the jacket to the right. The dotted line position of the ball, wedge and cam illustrate the full open position. The valve can be positioned at intermediate points between the dotted and full line positions shown.

The modification of the invention shown in Figs. 4–6 differs from that described heretofore in the method of actuating the wedge. The valve body 40, passageway 41 therethrough, threaded inlet end 42, threaded outlet end 43, valve seat 44, ball 45 and sliding jacket 46 are similar to that described in connection with Fig. 1. A wedge 47 passes through an opening 48 in the valve body 40 and extends into the passageway 41 where its sloping surface engages the ball 45. The wedge 47 reciprocates through a sealing gasket 49 secured in the body 40 surrounding the opening 48 to prevent leakage therethrough.

The upper end of the wedge 47 is provided with a pair of ears 48' extending perpendicularly thereto on each side thereof. The ears 48' are adapted to ride in an inclined slot 49' in a flange 50 extending upwardly from the sliding jacket 41. The jacket 51 is similar to the sliding jacket of Fig. 3, and is provided with the V-shaped flanges 52 at the lower ends and an opening 53 at the upper end thereof. An actuating knob 54 is provided at one end of the upwardly extending flange 50. The inclined slot 49' is so shaped that upon horizontal movement of the sliding jacket 51 the wedge 47 will move upwardly and downwardly due to the travel of the ears 48' in the inclined slot 49'.

Movement of the jacket 51 to the extreme left will cause the ears 48' to follow the inclined slot 49' and hence move the wedge downwardly. Downward movement of the wedge causes the ball to be forced to the left against the valve seat 44 thus shutting off the flow of fluid in the pipeline. Movement of the jacket to the right raises the wedge 47, as shown in the dotted lines, thus releasing the ball 45. Pressure of the fluid in the line will force the ball away from the valve seat thus permitting the flow of fluid. The slot 49' is shaped with a gentle slope from horizontal portions at each end thereof so that the amount of opening of the valve can be closely regulated.

It will be obvious to those skilled in the art that various changes may be made without departing from the spirit of the invention and therefore the invention is not limited to what is shown in the drawings and described in the specification but only as indicated in the appended claims.

I claim:

1. In a ball valve, the combination with a valve body having an opening formed therein extending into an axial passageway formed in said valve body, a valve seat located in said passageway adjacent the intersection of said opening and said passageway therein, and a ball adapted to engage the valve seat, of a wedge capable of vertical movement extending into the said valve body having a sloping surface at the lower end thereof adapted to engage the ball and upon which the ball travels, a pair of ears extending outwardly from the said wedge near the top thereof, a sliding jacket capable of sliding with respect to the valve body, and an inclined slot in said jacket adapted to receive the said ears whereby upon lateral movement of the jacket the wedge is moved in a vertical direction thus forcing the ball against the valve seat.

2. In a ball valve in accordance with claim 1, a fluid tight seal between the wedge and the valve body to prevent leakage therefrom.

3. In a ball valve, a valve body having an axially extending passageway formed therein, said passageway intersecting an opening formed in said valve body perpendicular to said passageway, a valve seat located in said passageway adjacent the intersection of said passageway and said opening, a ball disposed in said passageway and adapted to engage said valve seat, a wedge extending through said opening and adapted to be reciprocated therein, said wedge having a sloping surface formed on the lowermost end thereof engaging said ball, and a semi-cylindrical jacket slidably mounted on said valve body and operatively engaging said wedge, said jacket being moved laterally to actuate said wedge for moving said ball into engagement with said valve seat.

4. In a ball valve, a valve body having an axially extending passageway formed therein, said passageway intersecting an opening formed in said valve body perpendicular to said passageway, a valve seat located in said passageway adjacent the intersection of said passageway and said opening, a ball disposed in said passageway and adapted to engage said valve seat, a wedge extending through said opening and adapted to be reciprocated therein, said wedge having a sloping surface formed on the lowermost end thereof, engaging said ball, a semi-cylindrical jacket slidably mounted on said valve body, a cam secured to said sliding jacket and depending therefrom, said cam operatively engaging said wedge whereupon lateral movement of said jacket moves said cam forcing said wedge downwardly through said opening, thereby moving said ball into firm engagement with said valve seat.

5. In a ball valve, the combination with a valve body having an opening formed therein extending into an axial passageway formed in said body, a valve seat located in said passageway adjacent the intersection of said opening and said passageway, a ball adapted to engage the valve seat, a wedge capable of vertical movement extending into said opening in said valve body having a sloping surface adapted to engage the ball and upon which the ball travels, and a sliding jacket slidably mounted on said valve body engaging the wedge in such a manner that upon lateral movement of the jacket the wedge is moved in a vertical direction to force the ball against the valve seat.

6. In a ball valve, the combination with a valve body having an opening formed therein extending into an axial passageway formed in said body, a valve seat located in said passageway, a ball adapted to engage the valve seat, a wedge capable of vertical movement extending into said opening in said valve body having a sloping surface adapted to engage the ball and upon which the ball travels, a sliding jacket slidably mounted on said valve body engaging the wedge in such a manner that upon lateral movement of the jacket the wedge is moved in a vertical direction to force the ball against the valve seat, said sliding jacket being semi-cylindrical in shape and provided with inwardly extending flanges at the lower ends thereof, and a pair of guide tracks formed in said valve body adapted to receive said flanges.

7. In a ball valve, the combination with a valve body having an opening formed therein extending into an axial passageway formed in said body, a valve seat located in said passageway adjacent the intersection of said opening and said passageway, a ball adapted to engage the valve seat, a wedge capable of vertical movement extending into said opening in said valve body having a sloping surface adapted to engage the ball and upon which the ball travels, a sliding jacket slidably mounted on said valve body, a cam attached to and depending from the sliding jacket and engaging said wedge in such a manner that upon lateral movement of the jacket the wedge is moved in a vertical direction whereby the ball is forced against the valve seat.

8. In a ball valve, the combination with a valve body having an opening formed therein extending into an axial passageway formed in said body, a valve seat located in said passageway, a ball adapted to engage the valve seat, a wedge capable of vertical movement extending into said opening in said valve body having a sloping surface adapted to engage the ball and upon which the ball travels, a sliding jacket slidably mounted on said valve body, a cam attached to and depending from the sliding jacket and engaging said wedge in such a manner that upon lateral movement of the jacket the wedge is moved in a vertical direction whereby the ball is forced against the valve seat, said sliding jacket being semi-cylindrical in shape and provided with inwardly extending flanges at the lower ends thereof, and a pair of guide tracks in said valve body adapted to receive said flanges.

9. In a ball valve, the combination with a valve body, a valve seat therein, a ball adapted to engage the valve seat, a wedge capable of vertical movement extending into said valve body having a sloping surface at the lower end thereof adapted to engage the ball and upon which the ball travels, a pair of ears extending outwardly from said wedge near the top thereof, a sliding jacket capable of sliding with respect to said valve body, an inclined slot in said jacket adapted to receive said ears whereby upon lateral movement of the jacket the wedge is moved in a vertical direction thus forcing the ball against the valve seat, said sliding jacket being semi-cylindrical in shape and provided with inwardly extending flanges at the lower ends thereof, and a pair of guide tracks in said valve body adapted to receive said flanges.

10. In a ball valve in accordance with claim 5, a fluid tight seal between the wedge and the valve body to prevent leakage therefrom.

11. In a ball valve in accordance with claim 7, a fluid tight seal between the wedge and the valve body to prevent leakage therefrom.

MAX GRUNT.

References Cited in the file of this patent

UNITED STATES PATENTS

| Number | Name | Date |
| --- | --- | --- |
| 722,322 | Palm | Mar. 10, 1903 |
| 799,203 | Swinny | Sept. 12, 1905 |
| 964,804 | Parker | July 19, 1910 |
| 1,237,144 | Allen | Aug. 14, 1917 |
| 1,401,097 | Nickolaus | Dec. 20, 1921 |
| 1,666,283 | Farley | Apr. 17, 1928 |
| 1,891,287 | Niles | Dec. 20, 1932 |
| 2,011,601 | Williams | Aug. 20, 1935 |
| 2,034,367 | Angell | Mar. 17, 1936 |
| 2,139,926 | Byars | Dec. 13, 1938 |
| 2,222,273 | Worthington | Nov. 19, 1940 |
| 2,619,367 | Hanson | Nov. 25, 1952 |